3,152,993
RESINOUS COMPOSITIONS AS DETERGENT ADDITIVES
George P. Touey and Herman E. Davis, Kingsport, Tenn., assignors to Eastman Kodak Company, Rochester, N.Y., a corporation of New Jersey
No Drawing. Filed Aug. 1, 1961, Ser. No. 128,382
5 Claims. (Cl. 252—152)

This invention relates to compositions containing water-soluble salts of condensation products of formaldehyde with carbamides, amino-azines, or carbamides and amino-azines. This invention particularly relates to compositions of such salts with detergents and to the process of removing dirt from washable materials therewith. Our invention also relates to the suspension of soil particles in aqueous solution of water-soluble salts of condensation products of formaldehyde with carbamides, amino-azines or their mixtures.

In the laundering of fabrics the process may be conveniently divided into three stages:
(1) The detergent solution comes into intimate contact with the fabric or material.
(2) The soil particles are removed from the fabric and,
(3) Are prevented from being redeposited on the cloth.

One object of our invention is to provide compositions which are effective in removing soil during the washing of textile fabrics. Another object of our invention is to provide compositions which will prevent these removed dirt or soil particles from redepositing on the materials being washed. Other objects of our invention will appear herein.

We have found that water-soluble sulfonate slats of condensation products of formaldehyde and a carbamide, an amino-azine or a carbamide and an amino-azine are of value in laundering textile fabrics in that they aid in keeping the soil or dirt particles in suspension in the wash water and thus prevent them from dedepositing on the fabrics being laundered.

Up to the present time the principal substance which has been disclosed as of value as the suspending agent in detergents is sodium carboxymethylcellulose. We have found, however, that water-soluble sulfonate salts of condensation products of formaldehyde with carbamides, amino-azines, and carbamides and amino-azines are as good as or better than sodium carboxymethylcellulose in preventing the depositing of dirt particles onto the materials being washed.

The condensation products of formaldehyde with a carbamide, an amino-azine, or a carbamide and an amino-azine may be prepared by procedures known to those skilled in the art. The melamine-formaldehyde compound, for example, is preferably prepared under alkaline conditions, say at a pH of around 8. Each molecule of the condensation product should contain at least three units selected from the group consisting of the carbamides and the amino-azines. The carbamides which may be condensed with formaldehyde include urea, thiourea, guanidine, dicyanamide and the like. The amino-azines which may be condensed with formaldehyde include melamine, melam, ammeline, thioammeline and the like. Mixtures of carbamides and/or amino-azines may be employed. For present purposes, the preferred carbamide is urea and the preferred aminoazine is melamine. The condensation products of formaldehyde with urea are indicated in the following formula:

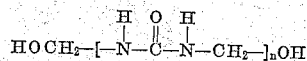

wherein $n$ may be from 3 to 50 but preferably is from 10 to 30. Similarly, the condensation products of formaldehyde with melamine may contain from 3 to 50, but preferably 3 to 30, methylol melamine residue units.

The water-soluble sulfonate salts of these condensation products, which are used in compositions in accordance with our invention, may be advantageously prepared by reacting the resin with alkali metal metabisulfite, sulfite, or bisulfite. An average of at least one sulfonate group for each four units of carbamide and/or amino-azine is desirable.

Example I will illustrate a method for the preparation of a water-soluble sulfonate salt of a condensation product of formaldehyde with urea.

EXAMPLE I 200 grams of paraformaldehyde was dissolved in an alcoholic alkaline solution consisting of 1134 cc. of ethanol, 66 cc. of water, and 5 g. of sodium hydroxide. 200 grams of urea was added slowly at room temperature and stirred until a homogeneous solution resulted. The heavy white precipitate which formed after standing for about 2 hours was separated and dried. The precipitate had a melting point of 278–285° C. with decomposition. The urea-formaldehyde precondensate thus formed was dissolved in 800 ml. of water, heated and adjusted to a pH of 5 with a dilute HCl solution. It was then refluxed until the solution became cluody (approximately 20 minutes). The pH was adjusted to 8–8.5 using ammonium hydroxide. 160 grams of sodium bisulfite were added and the resulting slurry was refluxed for 1.5 hours. A homogeneous solution resulted which on cooling to room temperature became viscous and faintly hazy. The pH was 7.2. The product was precipitated into 2 liters of methanol and stirred vigorously. The white granular precipitate which formed was removed by filtration and washed with 1 liter of methanol. The product was water-soluble which it retained even after heating at 100° C. for 16 hours. Analysis for sulfur indicated an average of 1 sodium sulfonate group for each 5 dimethylolurea units. The activty of the product as a detergent additive is demonstrated in Table I.

Example II demonstrates a method for the preparation of a water-soluble sulfonate salt of a condensation product of formaldehyde with melamine.

EXAMPLE II 126 grams of melamine was slurried in 300 grams of a 30% aqueous formaldehyde solution and the pH of the solution was adjusted to 8.5 by adding 30 ml. of concentrated ammonium hydroxide. The mixture was heated to 85° C. and maintained at this temperature for 1 hour. A clear homogeneous solution was formed. 31 grams of sodium bisulfite was added and the mixture was refluxed for 1.5 hours. The colorless syrup formed when cooled had a pH of 9.4. It was slowly poured into 2 liters of methanol while stirring vigorously, and the white granular precipitate which formed was removed by filtration and washed with 1 liter of methanol. The white solid was water-soluble which it retained even after heating at 100° C. for 16 hours. Analysis for sulfur indicated an average of 1 sodium sulfonate group for each 4 methylol melamine units. The activity of the product as a detergent additive is demonstrated in Table I.

Tests were run to determine the effectiveness of the detergent additive of our invention in preventing the deposition of soil suspended in water on fabrics therein. In these tests, a detergent solution was used which consisted of 0.15% sodium N-methyl-N-oleyl taurate as detergent, 0.05% sodium tripolyphosphate as builder and 99.8% water. 0.01 gram of each additive to be tested was respectively dissolved in a bottle in a 100 ml. portion of the detergent solution, and 5 cc. of Aqua Black-B (a 35% aqueous suspension of carbon black, manufactured by Binney and Smith Company, New York) was added to each. The detergent-soil solutions were heated to 140° F. for 10 minutes, whereupon a 2" x 2½" piece of clean, unsized white cotton cloth was added to each bottle. The respective solutions were transferred to standard Launder-O-Meter bottles (pint-size), each containing 10 steel balls, ¼-inch in diameter. The bottles were sealed and tumbled for 30 minutes at 140° F. in an Atlas Launder-O-Meter. The cloth samples were then removed from the soil solutions, rinsed in warm water, and dried. Reflectance curves were obtained for each washed cloth with a General Electric Recording Spectrophotometer calibrated against magnesium oxide which is taken as having a reflectance of 100%. In the table below the percent reflectance obtained for four wavelength values in the visible range of spectrum are recorded, for the sample before soiling, and for the samples resulting from the respective washing treatments listed:

*Table 1*

| Swatch No. | Washing solution | Additive | Reflectance at different wavelengths (millimicrons), percent | | | |
|---|---|---|---|---|---|---|
| | | | 400μ | 500μ | 600μ | 700μ |
| 1 | Unwashed control. | | 81 | 85 | 87 | 89 |
| 2 | Detergent solution. | | 28 | 30 | 32 | 34 |
| 3 | ----do---- | Sodium carboxymethylcellulose. | 58 | 59 | 61 | 64 |
| 4 | ----do---- | Sulfonated ureaformaldehyde condensate, Example 1. | 55 | 58 | 61 | 64 |
| 5 | ----do---- | Sulfonated melamineformaldehyde condensate, Example 2. | 69 | 72 | 75 | 77 |

The sulfonated condensation products described are adapted to be mixed with any of the commonly known anionic or non-ionic detergents such as soap, alcohol sulfates, alkyl aryl sulfonates, alkyl sulfonates, sulfated or sulfonated amides, esters and amines, non-ionic substances and miscellaneous types not readily classified. In general, the additives described may be employed with detergents for use in aqueous systems. The detergent may contain any of the inorganic salts commonly referred to as builders such as sodium sulfate, sodium phosphates, and sodium silicates. The ratio of additive to detergent may vary over a wide range depending on the type of detergent used and the amount of soil which is to be removed from the fabric. Usually, 1 to 10% detergent additive based on the combined weight of the detergent and builder is sufficient; we prefer to use 1–5% based on the weight of detergent and builder.

Although the invention has been described in considerable detail with reference to certain preferred embodiments thereof, it will be understood that variations and modifications can be effected within the spirit and scope of the invention as described hereinabove and as defined in the appended claims.

We claim:

1. A composition soluble in water to form a washing solution which is effective not only to remove soil from textile materials but also to minimize redeposition of removed soil comprising the mixture of an organic anionic detergent and a water soluble sulfonate salt of a condensation product of formaldehyde with a compound selected from the group consisting of urea and melamine.

2. The composition of claim 1 wherein the water soluble sulfonate salt is the salt of a condensation product of formaldehyde with at least three moles of urea, and contains at least one sulfonate group for each four units of urea.

3. The composition of claim 1 wherein the water soluble sulfonate salt is the salt of a condensation product of formaldehyde with at least three moles of melamine, and contains at least one sulfonate group for each four melamine units.

4. A washing solution which is effective not only to remove soil from textile materials but also to minimize redeposition of removed soil comprising water, an organic anionic detergent, and a water soluble sulfonate salt of a condensation product of formaldehyde with a compound selected from the group consisting of urea and melamine.

5. A process for removing soil from a textile material and minimizing the redeposition of removed soil on the material comprising washing the material with a solution comprising water, an organc anionic detergent and a water soluble sulfonate salt of a condensation product of formaldehyde with a compound selected from the group consisting of urea and melamine.

References Cited in the file of this patent

UNITED STATES PATENTS

| 2,798,047 | Touey et al. | July 2, 1957 |
| 2,854,437 | Polansky et al. | Sept. 30, 1958 |